US012720226B2

(12) United States Patent
Chen et al.

(10) Patent No.: US 12,720,226 B2
(45) Date of Patent: Aug. 25, 2026

(54) RANDOM MODULATION OF CHARGE-PUMP NOISE PHASES

(71) Applicant: Google LLC, Mountain View, CA (US)

(72) Inventors: Qingfei Chen, Mountain View, CA (US); Kwang Oh Kim, San Jose, CA (US)

(73) Assignee: Google LLC, Mountain View, CA (US)

(*) Notice: Subject to any disclaimer, the term of this patent is extended or adjusted under 35 U.S.C. 154(b) by 50 days.

(21) Appl. No.: 18/999,985

(22) Filed: Dec. 23, 2024

(65) Prior Publication Data

US 2025/0126374 A1 Apr. 17, 2025

Related U.S. Application Data

(60) Provisional application No. 63/730,256, filed on Dec. 10, 2024.

(51) Int. Cl.
*H04N 25/616* (2023.01)
*H04N 25/78* (2023.01)

(52) U.S. Cl.
CPC ........... *H04N 25/616* (2023.01); *H04N 25/78* (2023.01)

(58) Field of Classification Search
CPC ...... H04N 25/616; H04N 25/78; H04N 25/75; H04N 25/618; H04N 25/703
See application file for complete search history.

(56) References Cited

U.S. PATENT DOCUMENTS

| | | | | |
|---|---|---|---|---|
| 6,816,196 | B1 | 11/2004 | Mann | |
| 11,546,532 | B1 * | 1/2023 | Bahukhandi | H04N 25/709 |
| 2006/0001754 | A1 * | 1/2006 | Yanagisawa | H04N 25/57 348/E5.079 |
| 2006/0114345 | A1 * | 6/2006 | Wu | H04N 25/65 348/E3.018 |

(Continued)

FOREIGN PATENT DOCUMENTS

CN 113300700 A 8/2021

OTHER PUBLICATIONS

Wang, et al., "A random pulse modulation approach to modeling the flicker and white noise of the charge pump of a fractional-N frequency synthesizer", Abstract Only, Jun. 10, 2022, 1 page.

(Continued)

*Primary Examiner* — Hung H Lam
(74) *Attorney, Agent, or Firm* — Colby Nipper PLLC

(57) ABSTRACT

Techniques and apparatuses are described that implement random modulation of charge-pump noise phases to reduce structured noise induced by the charge pump. In an example aspect, a correlated double sampling (CDS) circuit is coupled to a pixel array including at least one pixel circuit. The CDS circuit receives an input signal generated by the at least one pixel circuit from the pixel array and samples a reset component of the input signal during a first sampling time to generate a reset component sample. The first sampling time is at a first offset from a reset control signal and prior to a settling time of the at least one pixel circuit. The CDS circuit samples a signal component of the input signal during a second sampling time to generate a signal component sample and determines an output signal based on the reset component sample and the signal component sample.

16 Claims, 6 Drawing Sheets

(56) References Cited

U.S. PATENT DOCUMENTS

| | | | | |
|---|---|---|---|---|
| 2012/0049903 A1* | 3/2012 | Oh | H03K 3/84 | 327/114 |
| 2015/0373291 A1* | 12/2015 | Oh | H04N 25/63 | 348/324 |

OTHER PUBLICATIONS

Weatherill, et al., "Automatic Selection of CDS Timing Parameters", Feb. 2019, 14 pages.

* cited by examiner

RANDOM MODULATION OF CHARGE-PUMP NOISE PHASES

CROSS-REFERENCE TO RELATED APPLICATION(S)

This application claims the benefit of U.S. Provisional Patent Application Ser. No. 63/730,256 filed on Dec. 10, 2024, the disclosure of which is incorporated by reference herein in its entirety.

SUMMARY

Techniques and apparatuses are described that implement random modulation of charge-pump noise phases to reduce charge-pump-induced structured noise. In an example aspect, a computing device includes an image sensor circuit, such as a complementary metal-oxide semiconductor (CMOS) image sensor, for capturing image data. The image sensor circuit includes a charge pump providing a charge pump voltage to a pixel controller. The pixel controller outputs control signals and/or a charge pump voltage to a pixel array including individual image pixel circuits. The pixel array provides pixel read-out data to a correlated double sampling (CDS) circuit. The CDS circuit samples the pixel read-out data at reset and signal sampling points using a CDS process to produce analog pixel data. An analog-to-digital converter (ADC) converts the analog pixel data to digital pixel data for further processing by a processor of the computing device, such as an image processor and/or an artificial intelligence (AI) accelerator. The reset sampling time and the signal sampling time with respect to a reset control signal are adjusted to occur prior to a settling time of the individual pixel circuits to induce a random modulation of charge-pump noise phases. As result, charge-pump-induced structured noise in the image data is reduced or eliminated.

Example aspects described below include an apparatus with a pixel array, a pixel controller, and a CDS circuit. The pixel array includes at least one pixel circuit configured to generate an input signal in response to receiving incident light thereon. The pixel controller is coupled to the pixel array and configured to provide a reset control signal to the pixel array. The CDS circuit is coupled to the pixel array. The CDS circuit is configured to receive the input signal from the pixel array and sample a reset component of the input signal during a first sampling time to generate a reset component sample. The first sample time corresponds to a first offset from the reset control signal and occurs prior to a settling time of the at least one pixel circuit. The CDS circuit is also configured to sample a signal component of the input signal during a second sampling time to generate a signal component sample. The CDS circuit can determine an output signal based on the reset component sample and the signal component sample.

Example aspects described below also include a method of implementing random modulation of charge-pump noise phases to reduce charge-pump-induced structured noise.

Example aspects described below additionally include a computer-readable storage medium having computer-executable instructions that, responsive to execution by a processor, implement random modulation of charge-pump noise phases to reduce charge-pump-induced structured noise. The computer-readable storage medium may include, for instance, firmware and/or fixed logic circuitry.

BRIEF DESCRIPTION OF DRAWINGS

Apparatuses for and techniques for implementing random modulation of charge-pump noise phases to reduce charge-pump-induced structured noise are described with reference to the following drawings. The same numbers are used throughout the drawings to reference like features and components.

DETAILED DESCRIPTION

Overview

Figure 1:
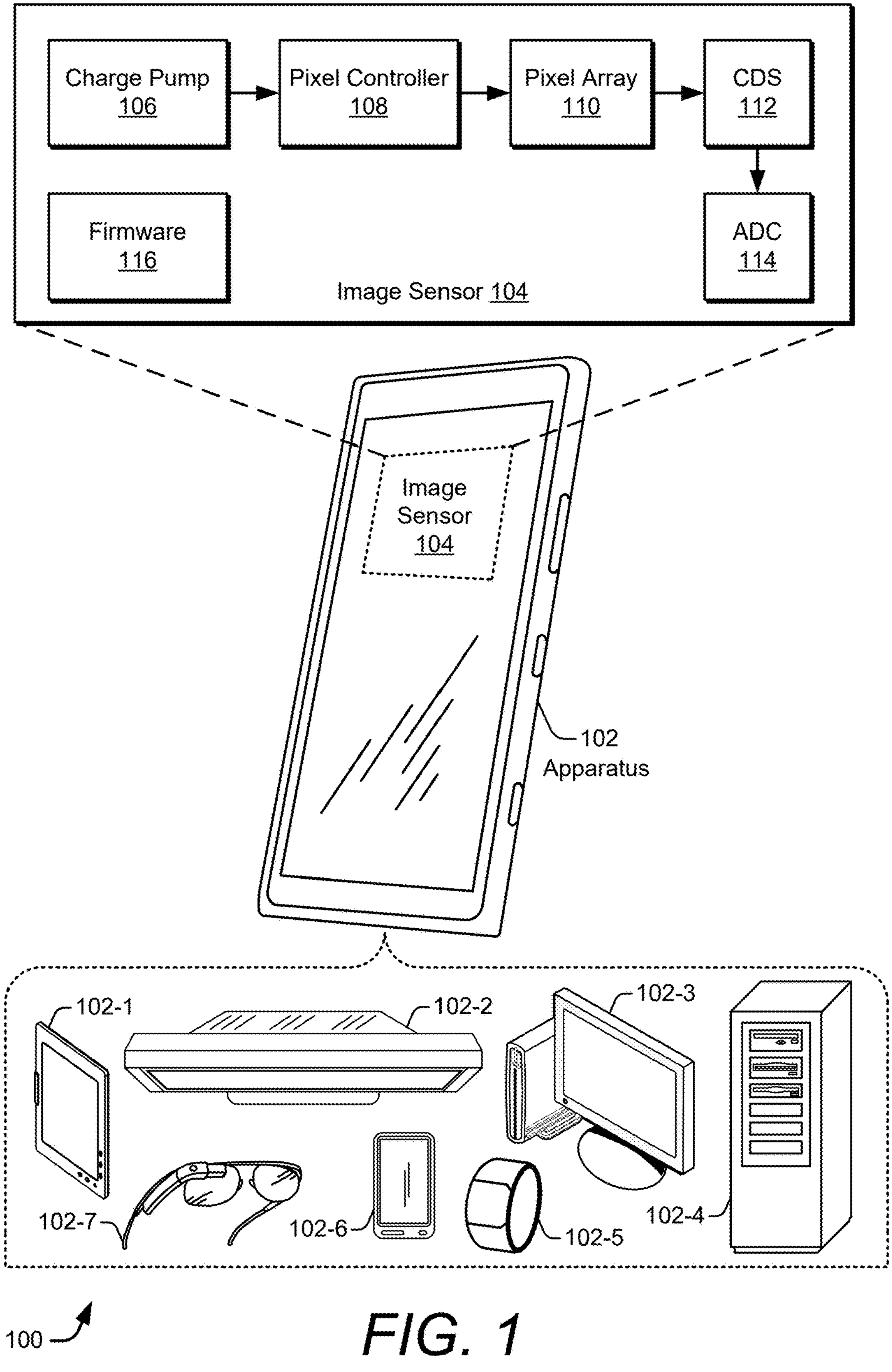
FIG. 1 illustrates an example environment in which aspects of random modulation of charge-pump noise phases to reduce charge-pump-induced structured noise can be implemented.

This document describes schemes, techniques, and hardware to improve the appearance of images captured by a camera. Electronic devices with cameras, such as mobile devices like smartphones, employ an image sensor circuit. The image sensor circuit operates with another circuit component called a charge pump to control signaling voltages. The charge pump includes multiple switches that open and close responsive to clock signals. This opening and closing of these switches create noise in the operation of the image sensor circuit. Because the clock signals have a regular frequency, the created noise has a regular pattern that "infects" the image-sensing pixels of the image sensor circuit. Due to the regularity of the pattern, the pattern becomes detectable to the human eye in the form of undesirable visible artifacts in a sensed image produced by the camera.

Described devices and processes prevent the regular noise of the charge pump from producing artifacts that are visible to the human eye. To do so, circuitry operates to smooth or smear out the regular noise from the charge pump using random voltage changes that are present in the image-sensing pixels. During operation, each image-sensing pixel drives a voltage to a first voltage level that then settles to a second voltage level at a rate that varies randomly across multiple pixels. As part of the light sensing for the camera, the image-sensing pixel samples this voltage. In one approach, the sampling occurs after a settling time in which the image-sensing pixels have the settled, second voltage level. This approach may be adopted to avoid the randomization factor arising from the different voltage settling rates. Unfortunately, this approach also permits the regular noise from the charge pump to seep into the captured camera image, thereby corrupting the image and rendering the picture unsatisfactory to the user.

With described approaches, on the other hand, the sampling time is adjusted to occur earlier so that the settling voltage is sampled during the setting time to actually leverage this randomized settling rate to achieve a benefit that is visually apparent to the user. The randomized settling rate results in settling voltages with randomized voltage levels during the sampling time. The randomized voltages are combined with the regular noise from the charge pump to reduce the regular noise. In effect, the regular noise is smoothed or smeared out with a filtering operation that removes the regular pattern from the image, which would otherwise be visually apparent. By reducing the impact of the regular noise, the filtering operation produces images with significantly reduced artifacts. Irregular or varied artifacts are far less visible to the human eye, so the picture quality is appreciably improved by implementing the techniques or hardware described herein.

Modern computing devices often include an image sensor circuit, such as CMOS image sensor circuits, having a pixel array comprised of individual pixels configured to sense incident light to capture a representation of an image. A charge pump is typically used to provide a charge pump voltage to the pixel array via a pixel controller during read-out of the individual pixels. CMOS image sensor performance is often affected by noise in the sensor circuit including both fixed-pattern noise and temporal noise. Fixed-pattern noise tends to remain substantially constant for each read-out while temporal noise may vary between read-outs. Both types of noise can produce undesirable distortion in the captured image.

One technique used to mitigate noise in image sensor circuits is the use of a CDS circuit to perform CDS operations during read-out. During conventional CDS operations, the CDS circuit samples the volage level of the output signal received from each pixel after pixel reset and again at a designated signal sampling time. In some approaches, the sampling time after reset occurs after the settling time of the individual pixels and represents a base voltage including the reset noise. The sampling at the designated signal sampling time represents the actual signal with the noise. This CDS procedure subtracts the reset noise from the actual signal to produce a signal value having reduced noise. However, these CDS approaches are often inadequate to compensate for such noise during pixel read-out. For instance, charge-pump-induced noise that is present during read-out of the pixels can still adversely impact images produced using these CDS approaches.

To address these challenges, techniques and apparatuses are described to implement random modulation of charge-pump noise phases to reduce charge-pump-induced structured noise. In some aspects, the sampling time of the noise source (e.g., charge-pump circuit noise) that affects the image sensor by generating structural pattern noise (e.g., row or column noise) is randomized. In an aspect, a CDS circuit samples the output signal at a time that is after the reset signal but before the respective settling times of each of the individual pixels. As a result, the output voltage is sampled at a time before each of the pixels has settled.

Various implementations operate based on the principle that each pixel may have a different settling time such that the slope of the voltage before settling may be different for each pixel according to a statistical distribution. In some cases, one or more of the pixel circuits in a pixel array have a different settling time compared to at least one other pixel circuit in the pixel array. For example, each of the pixel circuits can have a settling time that differs from a settling time of each of the other pixel circuits in the pixel array.

Various aspects leverage the statistical distribution of how the individual pixel settling times vary to make the charge-pump-induced noise at both CDS sampling points randomly-modulated. For instance, the image sensor CDS timing can cause the statistical average of the charge-pump noise phases at the two CDS sampling points to be close to identical for all phases. As a result, the row-wise and column-wise structured noise is eliminated, or at least substantially mitigated, in the resultant image. In some aspects, the randomized signal is applied to each pixel's reset level voltage during its read-out. The CDS circuit of the image sensor removes the random reset level during a CDS operation. As a result, extra noise is not generated even if the randomness is intentionally induced to the image sensor. Because charge pump noise has a fixed frequency and periodic noise, the randomization of the sampling time on the charge-pump noise breaks its periodic pattern as seen by the image sensor to produce a random pattern that is much less sensitive to visual perception.

Example Operating Environments

FIG. 1 is an illustration of an example environment 100 in which aspects of random modulation of charge-pump noise phases to reduce charge-pump-induced structured noise can be implemented. In the example environment 100, a computing device or apparatus 102 includes an image sensor circuit 104 (or image sensor 104). With the image sensor circuit 104, the computing device 102 can capture one or more images within the example environment 100 such as photos or video images taken by a user of the computing device 102.

In example implementations, the image sensor circuit 104 includes a charge pump 106, a pixel controller, 108, a pixel array 110, CDS circuitry 112, an analog to digital converter (ADC) 114, and firmware 116. The charge pump 106 is configured to provide a charge pump voltage to the pixel controller 108. In some implementations, the charge pump 106 is a two-phase charge pump. The pixel controller 108 provides a control signal and charge pump voltages to the pixel array 110 to control the capture and read-out of image data from the pixels of the pixel array 110. The pixel array 110 provides pixel read-out data to the CDS circuit 112. The CDS circuit 112 samples the pixel read-out data at reset and signal sampling points using a CDS process to produce analog pixel data.

The pixel controller 108 is configured to control the CDS circuit 112 to set or adjust the reset sampling time and the signal sampling time with respect to a reset control signal. The setting or adjustment causes sampling time(s) to occur prior to a settling time of the individual pixel circuits of the pixel array 110 to induce a random modulation of charge-pump noise phases to at least reduce, if not eliminate, the charge-pump-induced structured noise in the image data. The analog-to-digital converter (ADC) 114 converts the analog pixel data to digital pixel data for further processing by a processor of the computing device 102. The processor may be a general-purpose processor or a specific-purpose processor, such as an image processor or an AI accelerator. In an implementation, the firmware 116 is configured to store processor-executable instructions used by the pixel controller 108 to control aspects of the pixel array 110 via control signals. These control signals can include or relate to, for example, providing a reset control signal and adjusting the reset sampling time of a reset component and/or the signal sampling time of a signal component as further discussed herein.

The computing device 102 can be implemented using various non-limiting example devices including a smart phone, a desktop computer, a tablet, a laptop, a television, a computing watch, computing glasses, a home-automation system, an appliance (e.g., a microwave or a refrigerator), and a vehicle. Other devices may also be used, such as a gaming system, a home service device, a smart speaker, a smart thermostat, a baby monitor, a Wi-Fi® router, a drone, a trackpad, a drawing pad, a netbook, an e-reader, a wall display, and another home appliance. Note that the computing device 102 can be wearable, non-wearable but mobile, or relatively immobile (e.g., desktops and appliances).

Illustrated examples of the apparatus or computing device 102 include a tablet device 102-1, a smart television 102-2, a desktop computer 102-3, a server computer 102-4, a smartwatch 102-5, a smartphone (or document reader) 102-6, and intelligent glasses 102-7. In some cases, the apparatus or computing device 102 includes at least one application processor and/or at least one dedicated processor (not shown) and at least one computer-readable medium, which includes memory media and storage media. Applications and/or an operating system embodied as computer-readable instructions on the computer-readable medium can be executed by the application processor or the dedicated processor to provide some of the functionalities described herein.

Figure 2:
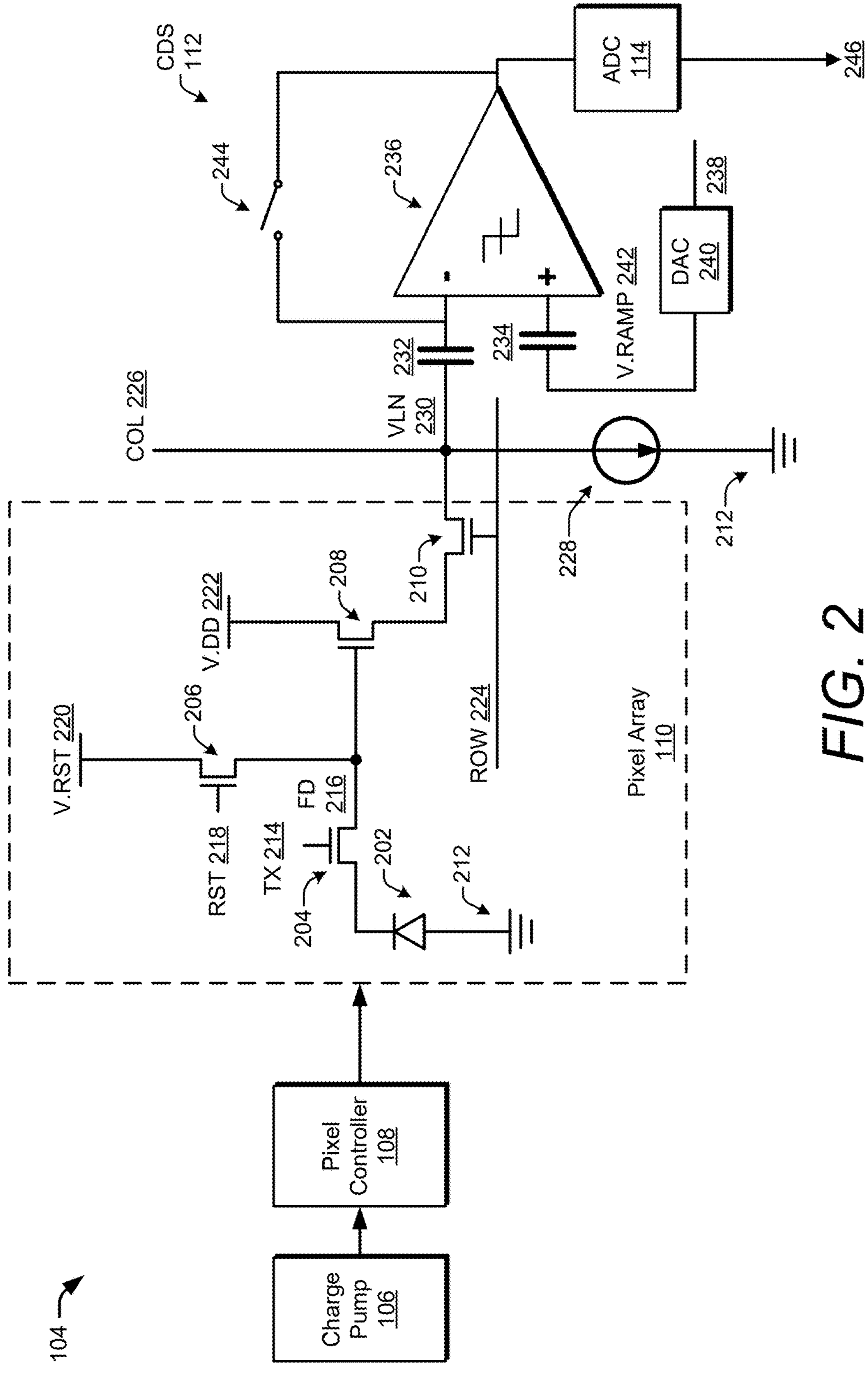
FIG. 2 illustrates an example implementation of an image sensor circuit for random modulation of charge-pump noise phases to reduce charge-pump-induced structured noise.

Examples of Image Sensor Circuits for Random Modulation of Charge-Pump Noise Phases FIG. 2 illustrates an example implementation of the image sensor circuit 104 for random modulation of charge-pump noise phases to reduce charge-pump-induced structured noise. In the depicted configuration, the image sensor circuit 104 includes the charge pump 106, the pixel controller 108, the pixel array 110, the CDS circuit 112, and the ADC 114. The charge pump 106 is configured to provide a charge pump signal to the pixel controller 108, and the pixel controller 108 is configured to provide one or more control signals and charge pump voltages to the pixel array 110. The pixel array 110 includes a photodiode 202, a charge transfer transistor 204, a reset transistor 206, a read-out transistor 208, a row select transistor 210, and a floating diffusion (FD) region 216. The FD region 216, which may also be referred to as a sense node, is configured to accumulate charge received from the photodiode 202. Although the pixel array 110 in the example implementation of FIG. 2 is shown as having a single pixel circuit for clarity of description, in other implementations the pixel array 110 may include a number of individual pixel circuits. In various implementations, the photodiode 202 may be realized as any type of photodetector device or light detecting device.

Still referring to the pixel array 110, a first terminal of the photodiode 202 is connected to a ground node 212, and a second terminal of the photodiode 202 is connected to a source terminal of the charge transfer transistor 204. A gate terminal of the charge transfer transistor 204 is configured to receive a transmission (TX) signal 214. A drain terminal of the charge transfer transistor 204 is connected to the FD region 216. A source terminal of the reset transistor 206 is connected to a reset voltage (V.RST) source 220, and a gate terminal of the reset transistor 206 is configured to receive a reset control (RST) signal 218. A drain terminal of the reset transistor 206 is connected to the FD region 216. A gate terminal of the read-out transistor 208 is connected to the FD region 216, and a source terminal of the read-out transistor 208 is connected to a voltage supply (V.DD) 222. A drain terminal of the read-out transistor 208 is connected to a source terminal of the row select transistor 210.

A gate terminal of the row select transistor 210 is connected to a row select control (ROW) signal 224, and a drain terminal of the row select transistor 210 is coupled to a read-out (VLN) node 230. The VLN node 230 is further connected to a column select control (COL) 226 and a current source 228. The current source 228 is further connected to the ground node 212. The TX signal 214, the RST signal 218, and the ROW signal 224 may be used to turn off and turn on the charge transfer transistor 204, the reset transistor 206, and the row select transistor 210, respectively.

Referring now to the CDS circuit 112, as depicted in FIG. 2, the CDS circuit 112 includes a first capacitor 232, a second capacitor 234, a comparator 236, a digital-to-analog converter (DAC) 240, and an auto-zero switch 244. The first capacitor 232 is connected between the read-out node 230 and a first input (e.g., an inverting input) of the comparator 236. The second capacitor 234 is connected between the DAC 240 and a second input (e.g., a non-inverting input) of the comparator 236. The auto-zero switch 244 is connected between the inverting input and an output of the comparator 236. The output of the comparator 236 is further connected to the ADC 114. The various illustrated components may, however, be coupled together in different manners and/or include more or fewer components. By way of example only, the terminals (e.g., source, drain, and gate) of the transistors may be coupled together in alternative ways.

During an example image capture operation, the charge transfer transistor 204 and the reset transistor 206 are both turned on, and the row select transistor 210 is turned off to flush residual charge from the photodiode 202. Subsequently, the charge transfer transistor 204 and the reset transistor 206 are turned off to initiate charge integration in which the photodiode 202 integrates photo-generated charge.

During an example read-out operation, the reset transistor 206 is turned on to flush accumulated charge from the FD region 216, and the row select transistor 210 is also turned on. A charge may then be read out of the FD region 216 and converted to a voltage (VLN) by the read-out transistor 208 and row select transistor 210. The voltage (VLN) is output to the read-out node 230 during a reset sampling operation.

In example operations, after reading the reference value from the FD region 216, the reset transistor 206 is turned off, and the charge transfer transistor 204 is turned on to transfer the photo-generated charge acquired by the photodiode 202 to the FD region 216 for temporary storage and subsequent read-out. The photo-generated charge is then read out of the FD region 216 and converted to the output signal VLN at the read-out node 230 by the read-out transistor 208 and the row select transistor 210 during a signal sampling operation.

The CDS circuit 112 is configured to receive the output signal VLN from the read-out node 230 at the inverting input of the comparator 236. The CDS circuit 112 also samples a reset component of the output signal VLN during the reset sampling operation and samples a signal component of the output signal VLN during the signal sampling operation. The DAC 240 receives a ramp voltage control signal 238 and generates an analog ramp signal (V.RAMP) 242 that is provided to the non-inverting input of the comparator 236 via the capacitor 234. The auto-zero switch 244 is controlled to selectively connect the output of the comparator 236 to the non-inverting input of the comparator 236 to sample the voltage VLN during the reset signal sampling operation and the signal sampling operation.

During the reset sampling operation, the comparator 236 compares the ramp signal (V.RAMP) 242 with the reset component of the output signal VLN to produce a first comparison result. During the signal sampling operation, the comparator 236 compares the ramp signal (V.RAMP) 242 with the signal component of the output signal VLN to produce a second comparison result. The CDS circuit 112 performs a CDS operation using the first comparison result and the second comparison result to produce a pixel output signal provided to the ADC 114.

In various implementations, the CDS circuit 112 samples the reset component at a time prior to the settling time of the pixel circuit of the pixel array 110 as further described herein. The output of the comparator 236 is provided to the ADC 114 which converts the output into a digital value 246 for further processing by a processor of the computing device 102. In some cases, the CDS circuit 112 applies a convolutional filter to the structured noise of a charge pump signal from the charge pump 106 (e.g., in the time domain) to at least partially randomize the effect of the structured noise of the charge pump signal on the output signal 246. This can smooth out or smear the structured noise that remains in the output signal 246 so that visually detectable artifacts arising from the structured noise are appreciably reduced, if not eliminated, in the resulting captured image.

Figure 3:
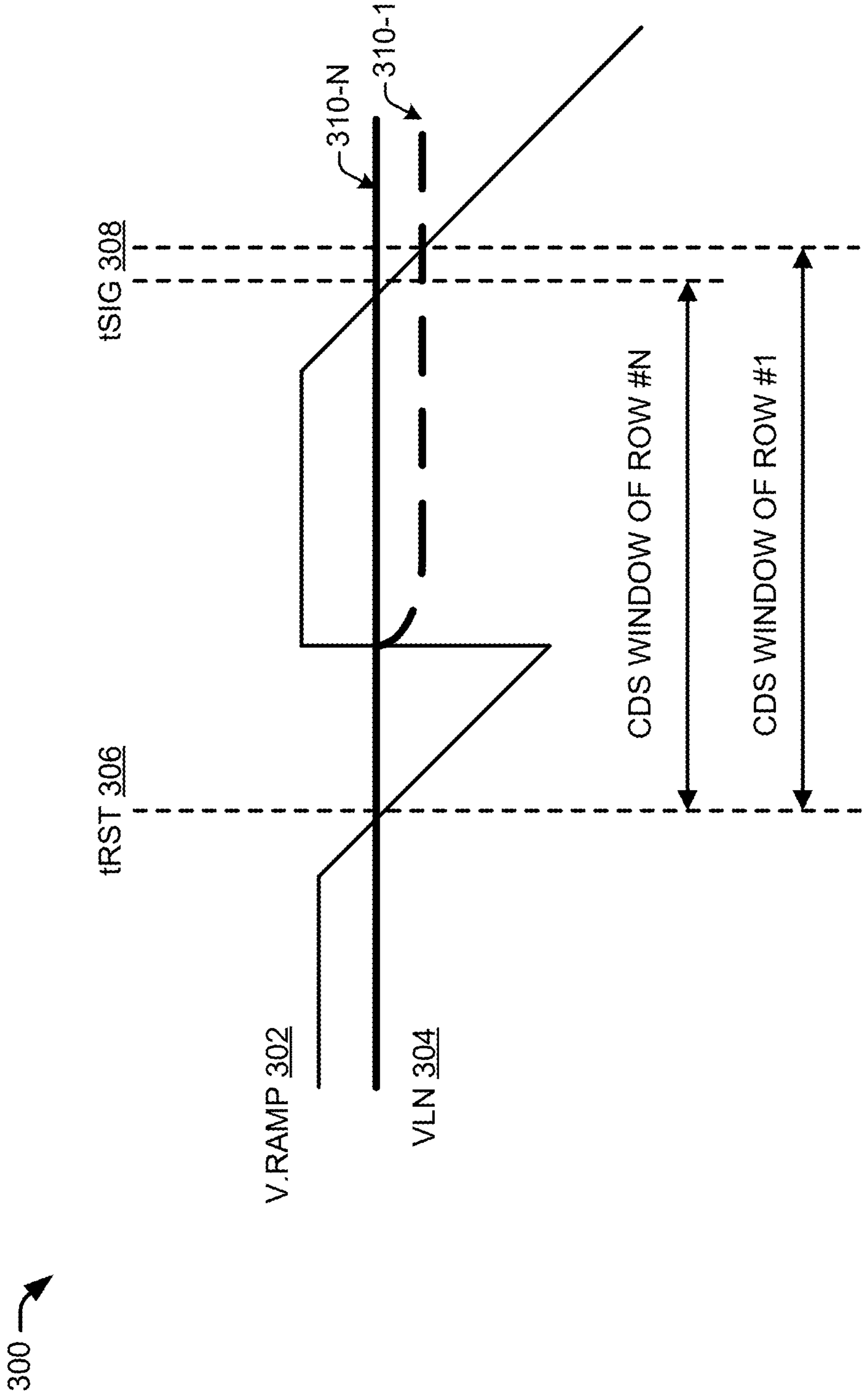
FIG. 3 illustrates an example timing diagram associated with implementing random modulation of charge-pump noise phases to reduce charge-pump-induced structured noise.

FIG. 3 illustrates an example timing diagram 300 associated with implementing random modulation of charge-pump noise phases to reduce charge-pump-induced structured noise. The timing diagram 300 shows values of the ramp signal (V.RAMP) 302 and output signals (VLN) 304 for N rows of pixels in the pixel array 110 over reset sampling and signal sampling operations. The reset component of the output signals VLN 304 is sampled at a reset sample time (tRST) 306, and the signal component of the output signals (VLN) 304 is sampled at a signal sample time (tSIG) 308. In the example of FIG. 3, the charge pump 106 is a two-phase charge pump that operates with two clock signals, each at a clock frequency of half of the overall frequency of the charge pump (e.g., ChargePump/2). Each clock signal operates at a different phase to alternately charge and discharge in a first phase (phase1) and a second phase (phase2).

The charge-pump noise phases at the tSIG sampling point 308 of the CDS circuit are image-signal-modulated because the CDS window is signal dependent. For example, a pixel signal that is representative of a pixel state of illumination, dark, or noise may have different tSIG sampling points and thus different CDS windows. In the example of FIG. 3, row #1 (310-1) has a different tSIG sampling point 308 and a different CDS window than row #N (310-N). As a result, in other implementations that do not randomly modulate charge-pump phase noises as described herein, row temporal noise (RTN), column fixed pattern noise (CFPN), row fixed pattern noise (RFPN), and photon transfer curve (PTC), as well as linearity, can be potentially affected.

In the example of FIG. 3, the Row #1 (310-1) tSIG 308 is at charge pump noise phase2 and tRST 306 is at charge pump noise phase1. After the CDS operation, the sensor sees power/ground fluctuation noise. For Row #N, both the tSIG 308 and tRST 306 are at charge pump noise phase1. After the CDS operation, the sensor sees zero noise. Accordingly, Row #1 and Row #N see different charge-pump noise levels.

In various implementations, the charge-pump noise at one or both the tRST and tSIG sampling points are caused to be randomly-modulated such that the statistical average of the charge-pump phase difference at tSIG 308 and tRST 306 are close to identical for all the pixels. The timing randomness is the same at tRST 306 and tSIG 308 at the same pixel's CDS sampling points. During the CDS operation, the CDS circuit 212 can remove the noise (e.g., CDS=tSIG−tRST) to avoid creating extra noise in the resultant image.

Figure 4:
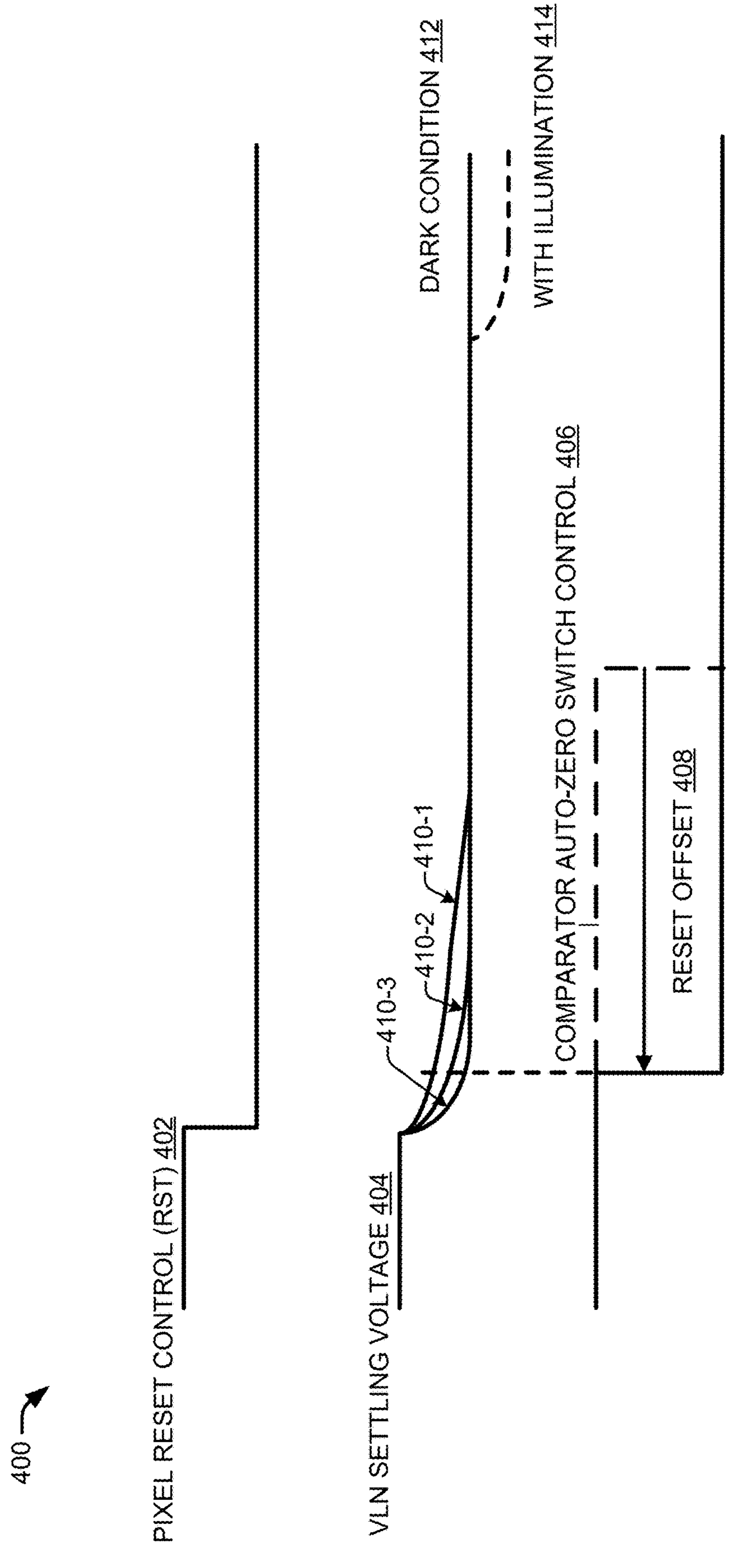
FIG. 4 illustrates another example timing diagram associated with implementing random modulation of charge-pump noise phases to reduce charge-pump-induced structured noise.

FIG. 4 illustrates another example timing diagram 400 associated with implementing random modulation of charge-pump noise phases to reduce charge-pump-induced structured noise. The timing diagram 400 shows values of a pixel reset control voltage 402, a VLN settling voltage 404, and a comparator auto-zero switch control 406. The pixel reset control voltage 402 initiates settling of the individual pixel circuits of the pixel array. As shown in FIG. 4, each of a first pixel 410-1, a second pixel 410-2, and a third pixel 410-3 has a different VLN settling voltage 404 time behavior including voltage slope and elapsed time due to physical variations in the pixel circuits. The first pixel 410-1 has a slower or longer settling time than that of the second pixel 410-2, and the second pixel 410-2 has a slower or longer settling time than that of the third pixel 410-3. In addition, the settling time of each pixel may be affected depending upon whether the pixel is under a dark condition 412 or under illumination 414.

During other approaches to CDS sampling operations, the comparator auto-zero switch control 406 causes sampling of the reset component at a time after the settling time of the first pixel 410-1, the second pixel 410-2, and the third-pixel 410-3 (e.g., up to all pixels). As a result, charge-pump-induced noise, such as structured noise, may be introduced into the resultant image. In accordance with various implementations that are described herein, however, a reset offset 408 is applied to the comparator auto-zero switch control 406 to cause the sampling of the reset component of each of the first pixel 410-1, the second pixel 410-2, and the third pixel 410-3 outputs to occur at a time prior to the settling time of each of the first pixel 410-1, the second pixel 410-2, and the third pixel 410-3 (or at least prior to the settling time of multiple pixels). Because each of the first pixel 410-1, the second pixel 410-2, and the third pixel 410-3 has a different settling time, the value of the VLN settling voltage 404 for each will be different, and this introduces randomness into the sampling process.

The reset offset 408 will be seen by the comparator 236 (of FIG. 2) at the input thereof. Although not shown in FIG. 4, in various implementations the same offset is applied to the comparator auto-zero switch control 406 during sampling of the signal component as is applied to the sampling of the reset component during the CDS operation. As a result, charge-pump phase noise is randomly modulated to reduce or substantially eliminate the charge-pump-induced structured noise (e.g., row and column pattern noise) in the image sensor.

Figure 5:
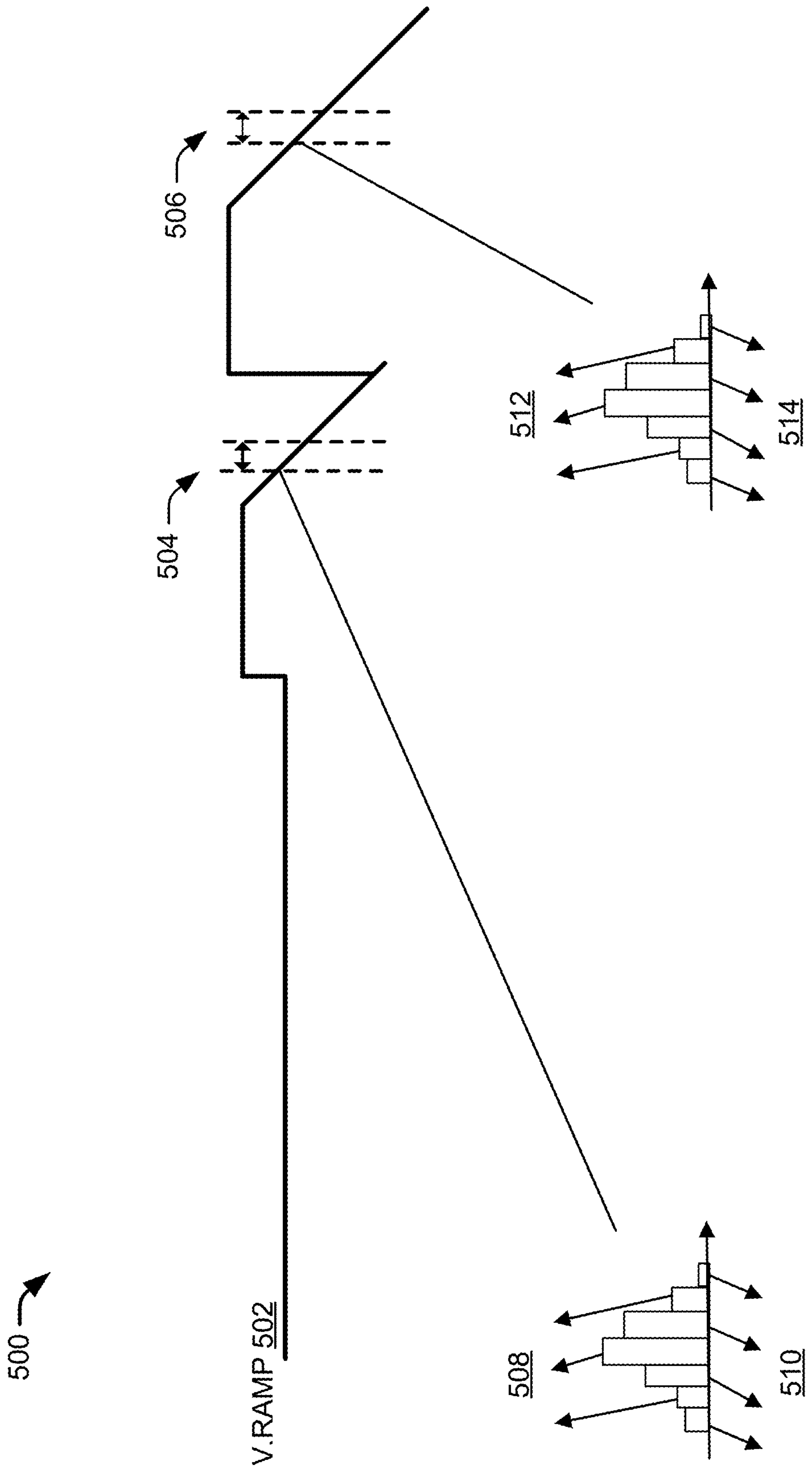
FIG. 5 illustrates yet another example timing diagram associated with implementing random modulation of charge-pump noise phases to reduce charge-pump-induced structured noise.

FIG. 5 illustrates yet another example timing diagram 500 associated with implementing random modulation of charge-pump noise phases to reduce charge-pump-induced structured noise. The timing diagram 500 of FIG. 5 shows values of the V.RAMP signal 502 during a reset sampling time and a signal sampling time for a number of pixels. The use of a reset offset applied to the reset control causes variance in pixel settling times to produce a reset-component sample-timing randomness 504 and a signal-component sample-timing randomness 506. In the example illustrated in FIG. 5, the timing randomness caused by pixel variances follows a distribution for both the reset component and the signal component.

In the illustrated example, each distribution is divided into a number of bins (DN). During reset-component sampling, the two-phase nature of the charge pump may cause the even DNs 508 in the distribution to affect the timing randomness during a second phase of the charge pump and the odd DNs 510 in the distribution to affect the timing randomness during the first phase of the charge pump. The reset-offset distribution of pixels in one row or one column at the reset sampling time causes the reset offset to be pixel-wise in nature. Similarly, during signal-component sampling, the even DNs 512 in the distribution may affect the timing randomness during the second phase of the charge pump, and the odd DNs 514 in the distribution may affect the timing randomness during the first phase of the charge pump. In the same way, the reset-offset distribution of pixels in one row or one column at the signal sampling time causes the offset to be pixel-wise in nature.

If the reset-offset distribution within pixels is within a few DNs, the average charge-pump noise of one row of pixels will be equal to approximately one-half of the sum of the charge-pump noise of the first phase and the charge-pump noise of the second phase according to the following equation: 0.5*(chargepump_noise_phase1+chargepump_noise_phase2). If this situation is achieved, the structured noise (e.g., row and column patterns) may be substantially eliminated.

Example Methods

Figure 6:
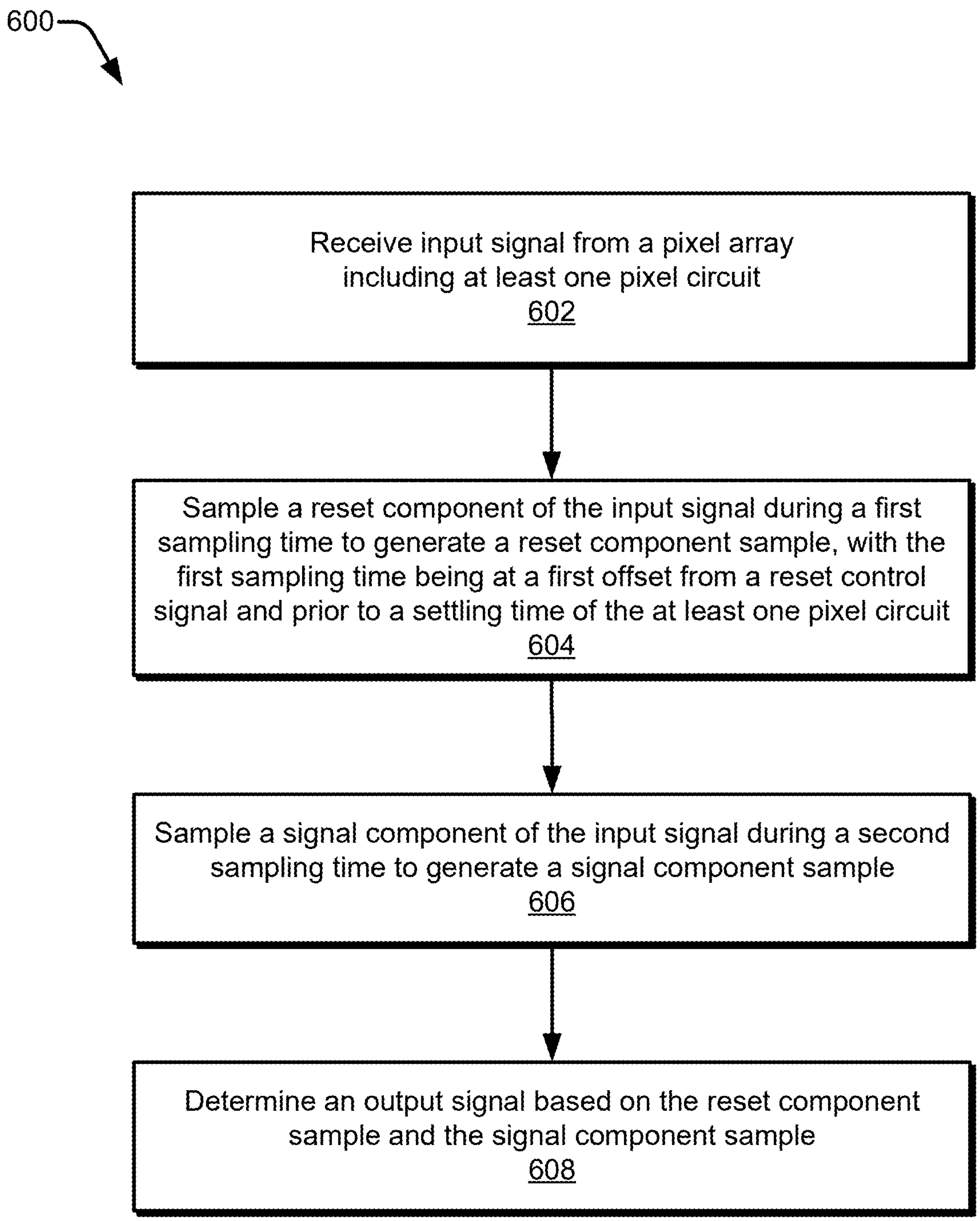
FIG. 6 illustrates an example method for implementing random modulation of charge-pump noise phases to reduce charge-pump-induced structured noise.

FIG. 6 illustrates an example method 600 for implementing random modulation of charge-pump noise phases to reduce charge-pump-induced structured noise. Method 600 is shown as a set of operations (or acts) that are performed; however, the method 600 is not limited to the order or combinations in which the operations are depicted in FIG. 6 or described herein. Further, any of one or more of the operations may be repeated, combined, reorganized, separated, or linked to provide a wide array of additional and/or alternate methods. In portions of the following discussion, reference may be made to the environment 100 of FIG. 1 and the entities depicted in FIG. 2, but reference is made by way of example only. The techniques are not necessarily limited to performance by one entity (e.g., component) or multiple entities operating on one device. In an implementation, the image sensor includes firmware 116 to facilitate the method 600 using one or more of the charge pump 106, the pixel controller 108, the pixel array 110, the CS 112, and the ADC 114.

At 602, the CDS circuit 112 receives an input signal from the pixel array 110 including at least one pixel circuit. The at least one pixel circuit is configured to generate an input signal in response to receiving incident light thereon. In an aspect, the pixel circuit includes a photodiode. In another aspect, the at least one pixel circuit comprises a plurality of pixel circuits in which one or more of the pixel circuits has a different settling time than at least one other pixel circuit of the plurality of pixel circuits. In yet another aspect, a pixel controller 108 is coupled to the pixel array 110. The pixel controller 108 is configured to provide a reset (RST) control signal 218/402 to the pixel array 110.

At 604, the CDS circuit 112 samples a reset component of the input signal (VLN 230) during a first sampling time to generate a reset component sample. The first sampling time is at a first offset from the reset control signal and prior to a settling time of the at least one pixel circuit. In an aspect, the first sampling time is before the settling time of each of the plurality of pixel circuits (e.g., of some portion or all the pixel array 110). In another aspect, each of the plurality of pixel circuits has a settling time that differs from a settling time of each of the other pixel circuits of the plurality of pixel circuits (e.g., of some portion or all the pixel array 110).

At 606, the CDS circuit 112 samples a signal component of the input signal during a second sampling time to generate a signal component sample. In an aspect, the second sampling time is based on the first offset. At 608, the CDS circuit 112 determines an output signal based on the reset component sample and the signal component sample.

In an aspect, the CDS circuit 112 may include a comparator 236 having a first input terminal configured to receive the input signal, a second input terminal configured to receive a ramp voltage, and an output terminal configured to provide the output signal. In another aspect, the CDS circuit 112 may further include an auto-zero switch 244 configured to connect the first input terminal to the output terminal at the first sampling time to generate the reset component sample. In an aspect, a charge pump 106 may be configured to provide a charge pump signal to the pixel controller 108, and the reset control signal may be based on the charge pump signal. In another aspect, the charge pump is a two-phase charge pump.

Conclusion

Although techniques using, and apparatuses and circuits to implement, random modulation of charge-pump noise phases to reduce charge-pump-induced structured noise have been described in language specific to certain features and/or methods, it is to be understood that the subject matter of the appended claims is not necessarily limited to the specific features or methods described. Rather, the specific features and methods are disclosed as example implementations of random modulation of charge-pump noise phases to reduce charge-pump-induced structured noise.

What is claimed is:

1. An apparatus comprising:

a pixel array including at least one pixel circuit, the at least one pixel circuit configured to generate an input signal in response to receiving incident light thereon;

a pixel controller coupled to the pixel array, the pixel controller configured to provide a reset control signal to the pixel array; and a correlated double sampling (CDS) circuit coupled to the pixel array, the CDS circuit configured to:

receive the input signal from the pixel array;

sample a reset component of the input signal during a first sampling time to generate a reset component sample, the first sampling time being at a first offset from the reset control signal and prior to a settling time of the at least one pixel circuit;

sample a signal component of the input signal during a second sampling time to generate a signal component sample; and determine an output signal based on the reset component sample and the signal component sample.

2. The apparatus of claim 1, wherein the CDS circuit comprises:

a comparator including:

a first input terminal configured to receive the input signal;

a second input terminal configured to receive a ramp voltage; and an output terminal configured to provide the output signal; and an auto-zero switch configured to connect the first input terminal to the output terminal responsive to the first sampling time to generate the reset component sample.

3. The apparatus of claim 1, further comprising:

a charge pump configured to provide a charge pump signal to the pixel controller, the reset control signal being based on the charge pump signal.

4. The apparatus of claim 3, wherein the charge pump comprises a two-phase charge pump.

5. The apparatus of claim 3, wherein:

the pixel controller is configured to provide the reset control signal to the pixel array based on the charge pump signal; and the pixel controller is configured to provide a row signal and a transmission signal to the pixel array based on the charge pump signal.

6. The apparatus of claim 3, wherein:

the charge pump signal exhibits structured noise; and the output signal is affected by the structured noise of the charge pump signal.

7. The apparatus of claim 6, wherein:

the CDS circuit is configured to reduce an effect of the structured noise of the charge pump signal on the output signal based on the first sampling time being prior to the settling time of the at least one pixel circuit.

8. The apparatus of claim 7, wherein:

the CDS circuit is configured to apply a convolutional filter to the structured noise of the charge pump signal to smooth out the structured noise in the output signal.

9. The apparatus of claim 8, wherein:

the CDS circuit is configured to apply the convolutional filter to the structured noise of the charge pump signal in the time domain to at least partially randomize the effect of the structured noise of the charge pump signal on the output signal.

10. The apparatus of claim 1, wherein the second sampling time is based on the first offset.

11. The apparatus of claim 1, wherein the at least one pixel circuit comprises:

a plurality of pixel circuits, one or more pixel circuits of the plurality of pixel circuits having a different settling time than at least one other pixel circuit of the plurality of pixel circuits.

12. The apparatus of claim 11, wherein the first sampling time is before the settling time of each of the plurality of pixel circuits.

13. The apparatus of claim 11, wherein each pixel circuit of the plurality of pixel circuits has a settling time that differs from a settling time of each other pixel circuit of the plurality of pixel circuits.

14. The apparatus of claim 1, wherein the at least one pixel circuit comprises a photodiode.

15. The apparatus of claim 1, wherein the apparatus comprises an image sensor.

16. The apparatus of claim 15, wherein the apparatus further comprises an electronic device including the image sensor.

* * * * *